United States Patent [19]

Endo et al.

[11] Patent Number: 5,717,783
[45] Date of Patent: Feb. 10, 1998

[54] COLOR CORRECTION APPARATUS AND METHOD AND COLOR IMAGE PROCESSING SYSTEM INCLUDING THE SAME

[75] Inventors: Hiroyuki Endo; Michiko Kawano; Taeko Koizumi, all of Kawasaki, Japan

[73] Assignee: Fujitsu Limited, Kawasaki, Japan

[21] Appl. No.: 428,433

[22] Filed: Apr. 25, 1995

[30] Foreign Application Priority Data

Apr. 27, 1994 [JP] Japan .................. 6-090018

[51] Int. Cl.⁶ .................................... G03F 3/08
[52] U.S. Cl. ................ 382/167; 358/518; 358/519; 358/520; 358/523; 358/525
[58] Field of Search .................. 358/518, 504, 358/523, 515, 527, 517, 524, 406, 509, 475, 519, 525, 530; 382/167, 166; 395/126, 127, 129, 131; 250/226; 356/402, 446

[56] References Cited

U.S. PATENT DOCUMENTS

| | | | |
|---|---|---|---|
| 5,111,286 | 5/1992 | MacDonald et al. | 358/500 |
| 5,270,808 | 12/1993 | Tanioka | 358/527 |
| 5,289,295 | 2/1994 | Yumiba et al. | 358/518 |
| 5,311,332 | 5/1994 | Imao et al. | 358/520 |
| 5,315,415 | 5/1994 | Kawai et al. | 358/518 |
| 5,323,249 | 6/1994 | Liang | 358/523 |
| 5,331,439 | 7/1994 | Bachar | 358/523 |
| 5,349,452 | 9/1994 | Maeda et al. | 358/527 |
| 5,377,025 | 12/1994 | Spaulding et al. | 358/518 |
| 5,406,394 | 4/1995 | Numakura et al. | 358/518 |
| 5,448,379 | 9/1995 | Ishihara et al. | 358/504 |
| 5,481,380 | 1/1996 | Bestmann | 358/518 |

FOREIGN PATENT DOCUMENTS

| | | |
|---|---|---|
| 0 123 701 | 11/1984 | European Pat. Off. |
| 0 488 656 | 6/1992 | European Pat. Off. |
| 43 10 727 | 10/1993 | Germany |
| 62-200471 | 9/1987 | Japan |
| 2-076760 | 3/1990 | Japan |
| 3-034764 | 2/1991 | Japan |

*Primary Examiner*—Edward L. Coles, Sr.
*Assistant Examiner*—Fan Lee
*Attorney, Agent, or Firm*—Staas & Halsey

[57] ABSTRACT

A color image processing system in which image data generated in other systems can be commonly used is disclosed. In the color image data processing system, an image processing unit processes color image data represented in a uniform color space system under illumination by a first light source, and the image data includes information relating to the first light source. An image output unit receives color image data represented in a uniform color space system under illumination by a second light source and produces color images according to the color image data. A correction control unit in the image processing unit judges whether or not the first light source coincides with the second light source. A correction formula calculating unit calculates a correction formula corresponding to the difference in characteristics between the first light source and the second light source. A light source difference correction unit corrects the color image data according to the correction formula.

20 Claims, 13 Drawing Sheets

Fig.5A $$\begin{bmatrix} L \\ a \\ b \end{bmatrix} = \begin{bmatrix} a_{ij} \end{bmatrix} \{R^2, G^2, B^2, RG, GB, BR, R, G, B, 1\}$$

Fig.5B $$\begin{bmatrix} R \\ G \\ B \end{bmatrix} = \begin{bmatrix} A_{ij} \end{bmatrix} \{L^2, a^2, b^2, La, ab, bL, L, a, b, 1\}$$

Fig. 7

| IDENTIFICATION OF LIGHT SOURCE | COLOR DATA OF PIXELS (L*a*b*) |
|---|---|

Fig. 8

| NAME OF LIGHT SOURCE | L*a*b* DATA OF GRAY POINTS | | | | | |
|---|---|---|---|---|---|---|
| | L1 | a1 | b1 | ---- Ln | an | bn |

Fig. 9

| C | L*a*b* DATA OF GRAY POINTS |
|---|---|
| D65 | L*a*b* DATA OF GRAY POINTS |
| ⋮ | ⋮ |
| D50 | L*a*b* DATA OF GRAY POINTS |

Fig.13

LIGHT SOURCE INFORMATION OF IMAGE DATA

| C | L11 | a11 | b11 | ------- | L1n | a1n | b1n |

$L1i < L < L1(i+1)$
$a1 = (L-L1i)/(L1(i+1)-L1i) * (a1(i+1)-a1i) + a1i$
$b1 = (L-L1i)/(L1(i+1)-L1i) * (b1(i+1)-b1i) + b1i$

LIGHT SOURCE INFORMATION OF PRINTER

| D65 | L21 | a21 | b21 | ------- | L2n | a2n | b2n |

$L2i < L < L2(i+1)$
$a2 = (L-L2i)/(L2(i+1)-L2i) * (a2(i+1)-a2i) + a2i$
$b2 = (L-L2i)/(L2(i+1)-L2i) * (b2(i+1)-b2i) + 2i$ $\Delta a = a2 - a1$
$\Delta b = b2 - b1$ $a \leftarrow a + \Delta a$
$b \leftarrow b + \Delta b$

Fig.14

$L1i < L < L1(i+1)$ $$t = (L-L1i)/L1(i+1)-L1i \quad \cdots (1)$$

$$(a1, b1) = A1t^3 + A2t^2 + A3t + A4 \quad \cdots (2)$$

$$\left.\begin{array}{l} A1 = 2(Pi-P(i+1)) + Pi' + P(i+1)' \\ A2 = 3(P(i+1)-Pi) - (2Pi' + P(i+1)') \\ A3 = Pi \\ A4 = Pi \end{array}\right\} \quad \cdots (3)$$

Pi AND Pi' ARE CALCULATED BY
SOLVING THE FOLLOWING EQUATION $$\begin{bmatrix} 2 & 1 & & & & 0 \\ 1 & 4 & 1 & & & \\ & 1 & 4 & 1 & & \\ & & & \ddots & & \\ 0 & & & & 1 & 4 & 1 \\ & & & & & 1 & 2 \end{bmatrix} \begin{bmatrix} P1' \\ \vdots \\ \vdots \\ Pn' \end{bmatrix} = \begin{bmatrix} 3(P2-P1) \\ 3[(P2-P1)+(P3-P2)] \\ \vdots \\ \vdots \\ 3(Pn-P(n-1)) \end{bmatrix}$$

$$\cdots (4)$$

COLOR CORRECTION APPARATUS AND METHOD AND COLOR IMAGE PROCESSING SYSTEM INCLUDING THE SAME

BACKGROUND OF THE INVENTION

1. Field of the Invention

The present invention relates to a color image processing system. Particularly, the present invention relates to a color correction apparatus and a color correction method, in a color image processing system, for correcting color image data, which is represented in a uniform color space system, to be output apparatuses such as color printers, color displays and so forth.

2. Description of the Related Art

When newspapers, magazines and books are published, images such as color photographic images, color printed images and so forth are converted into digital color image data by image digitizing apparatuses such as color image scanners, then, a variety of editing processes are performed on the digital color image data. The color image data is displayed on a color display in response to a command by the operator. The operator performs the editing operations while viewing a color display. The edited image data is output to output apparatuses such as color printers and converted into printed images.

The above processes are performed in a digital color image processing system which is constituted by an image digitizing apparatus, an image data processing apparatus, a color display and an image output apparatus. The digital color image processing system is required to output high quality images from the image output apparatus. Particularly, color reproduction characteristics are important. In order to realize this requirement, the operator performs color correcting operations on the image data, by using the image data processing apparatus, before it is output to the image output apparatus. In these operations, the operator confirms the corrected results by viewing the corrected image on a color display. Therefore, the color display is also required to reproduce a high-quality color image.

Color image scanners, color printers, color displays and so forth each have their own color characteristics. Further, there are many kinds of color image scanners, many kinds of color printers, many kinds of color displays and so forth and each of them has its own color reproduction characteristics. Therefore, a conventional color image processing system is constituted with apparatuses which are exclusively developed for the system. Namely, the constitution of the system is fixed and every apparatus constituting the system is adjusted so that a high-quality image can be reproduced in the fixed system. This means that each of the conventional color image processing systems is respectively a closed system and compatibility of image data between the color image processing systems is not considered. The conventional color image processing systems are mainly used in printing factories, therefore, it is not a problem that the color image processing system is closed.

Further, an expert operator, having know-how of the color correcting operation in the system, performs the color correcting operation in order to realize the high quality color reproduction. Therefore, an ordinary operator cannot easily perform the color correcting operations.

In the conventional color image processing systems, image data is represented in an RGB (Red, Green, Blue) system of color representation or in a CMYK (Cyan, Magenta, Yellow, Black) system of color representation. In the following, the RGB system of color representation is called the RGB system, and the CMYK system of color representation is called the CMYK system. The image data represented in the RGB system or the CMYK system is easily influenced by the color characteristics of input and output apparatuses. Because the image data represented in these systems of color representations indicates gradation levels of respective primary colors of each pixel generated by the color image scanner, the image data cannot be separated from the characteristic of the color image scanner. Therefore, image data generated in one color image processing system could not be used in other systems. However, it is required that image data generated in one color image processing system can be used in other systems.

Further, in recent years, small scale publishing systems such as desk-top publishing systems have spread into many fields. These small publishing systems are required to be constituted at low cost, therefore, they are constituted with a combination of apparatuses selected from widely used ones. In these small scale systems, it is more strongly required that image data generated in various systems can be commonly used. Namely, these small scale systems should be open systems.

Color fog correction is one of the color correction operations. Color fog correction is performed to images having unnecessary color components. For example, photographs turn reddish due to discoloration of deterioration with age. Photographic images taken in the evening also become reddish. In the color fog corrections, red components are deleted. When the color fog corrections are performed to the digital image data obtained from these images, the vivid colors which the photographies had before they became reddish are reproduced and high-quality photographic images can be obtained.

When color fog correction is performed in the conventional color image processing apparatuses, an operator indicates one pixel in the image and changes color components of the pixel. Change amounts of the color components are respectively calculated and other pixels of the image are changed according to the calculated change amounts of the color components. As described above, in the conventional color image processing systems, image data is represented in the RGB system or the CMYK system. Therefore, the color of the pixel selected by the operator is displayed on the screen, and the operator respectively changes the RGB or the CMYK components of the displayed color. The displayed color changes according to the changes indicated by the operator. For example, when reddish image is corrected, an operation to reduce the R component is usually performed, but G and B components can also be changed. When the displayed color becomes the desired color, the operator determines this color to be a target color. The color image data processing apparatus calculates the change ratios of respective components between the original color and the target color, and changes the colors of other pixels according to the change ratios.

However, the RGB system of color representation and the CMYK system of color representation do not agree with human color sensitivity. Therefore, the apparent change in the displayed color cannot be easily predicted according to the changes in RGB or CMYK components. In practice, the color fog corrections are complicated even for experienced operators, and the color fog corrections are difficult for operators who do not have sufficient experience.

SUMMARY OF THE INVENTION

A first object of the present invention is to realize a color image processing system in which image data generated in other systems can be commonly used and a color correction apparatus and a color correction method for use in the color image processing system.

A second object of the present invention is to realize a color correction apparatus and a color correction method in which color fog correction is easily performed.

A color image data processing system according to a first aspect of the present invention includes an image processing unit which processes input color image data an image output unit which receives color image data from the image processing unit and produces color images according to the color image data received from the image processing unit. In order to realize the first object, image data is represented in a uniform color space system under illumination by a first light source, and the image data includes information relating to the first light source. Further, an image output means receives image data represented in uniform color space system under illumination by a second light source and produces color images according to the color image data. The image processing unit includes a correction control unit which extracts the first light source information from the color image data and judges whether or not the first light source coincides with the second light source and starts a light source correction operation when the first light source does not coincide with the second light source, a correction formula calculating unit which calculates a correction formula corresponding to a difference of characteristics between the first light source and the second light source when the light source correction operation is started; and a light source difference correction unit which corrects the color image data according to the correction formula when the light source correction operation is started.

There are two main color representation systems, one of which is a color mixing system which includes the RGB system of color representation and the CMYK system of color representation, and the other of which is a color appearance system in which object color is represented in a way similar to human perception. In the color appearance system, perceived color space is constituted with three dimensional rectangular coordinate system with a, lightness index axis and two perceptual chromaticity index axes. The perceived color space of the color appearance system in which geometrical distance between two points is proportional to perceptual difference of two colors indicated by the two points is called a uniform perceptual space or a uniform color space (UCS) system. The Munsell color system, a L*a*b*, a L*u*v* and so forth are included in the UCS system.

Image data represented in UCS system corresponds to object color estimated according to human perception. Therefore, when image input (digitizing) apparatuses are formed and adjusted to output image data represented in the UCS system and image output apparatuses are formed and adjusted to receive image data represented in the UCS system, the image data represented in the UCS system is not influenced by the characteristics of the image input and output apparatuses. This means that image data represented in the UCS system can be commonly used in any system according to the present invention.

Because perceptual object color is changed according to a spectral characteristic of illumination, image data represented in the UCS system changes according to the spectral characteristic of illumination. Therefore, when the image data is represented in the UCS system, the spectral characteristic of the light source of the illumination must be defined. In the system according to the present invention, the light source of illumination of an image data representation system is compared with that of an output apparatus. When they do not coincide, the correction for correcting the difference due to different light sources is performed. Therefore, image data represented in the UCS systems under illumination of a first light source is precisely reproduced by an output apparatus which receives image data represented in the UCS system under illumination of a second light source different from the first light source.

According to a second aspect of the present invention, in a color fog correction operation, an indicated color which is indicated as a base color of the operation and a target color are represented in an UCS system and operations relating to inputs of the indicated color and the target color and correction operations are performed in the UCS system.

In the color correction apparatus and the color correction method according to the present invention, the color fog correction operation is performed in the UCS system which corresponds to human perception. Therefore, the color fog correction operation can be easily and precisely performed.

BRIEF DESCRIPTION OF THE DRAWINGS

The present invention will be more clearly understood from the description as set forth below with reference to the accompanying drawings, wherein:

FIG. 5A is a diagram showing a transform formula from RGB data to L*a*b* data;

FIG. 5B is a diagram showing a transform formula from L*a*b* data to RGB data;

FIG. 7 is a diagram showing a constitution of image data;

FIG. 8 is a diagram showing a constitution of a light source information storing unit;

FIG. 9 is a diagram showing a constitution of light source information table;

FIG. 13 is a diagram for explaining a correction formula calculating method;

FIG. 14 is a diagram for explaining another correction formula calculating method;

DESCRIPTION OF THE PREFERRED EMBODIMENTS

Before proceeding to a detailed description of the preferred embodiments of the present invention, a conventional graphic system will be described to allow a clearer understanding of the differences between the present invention and the prior art.

Figure 1:
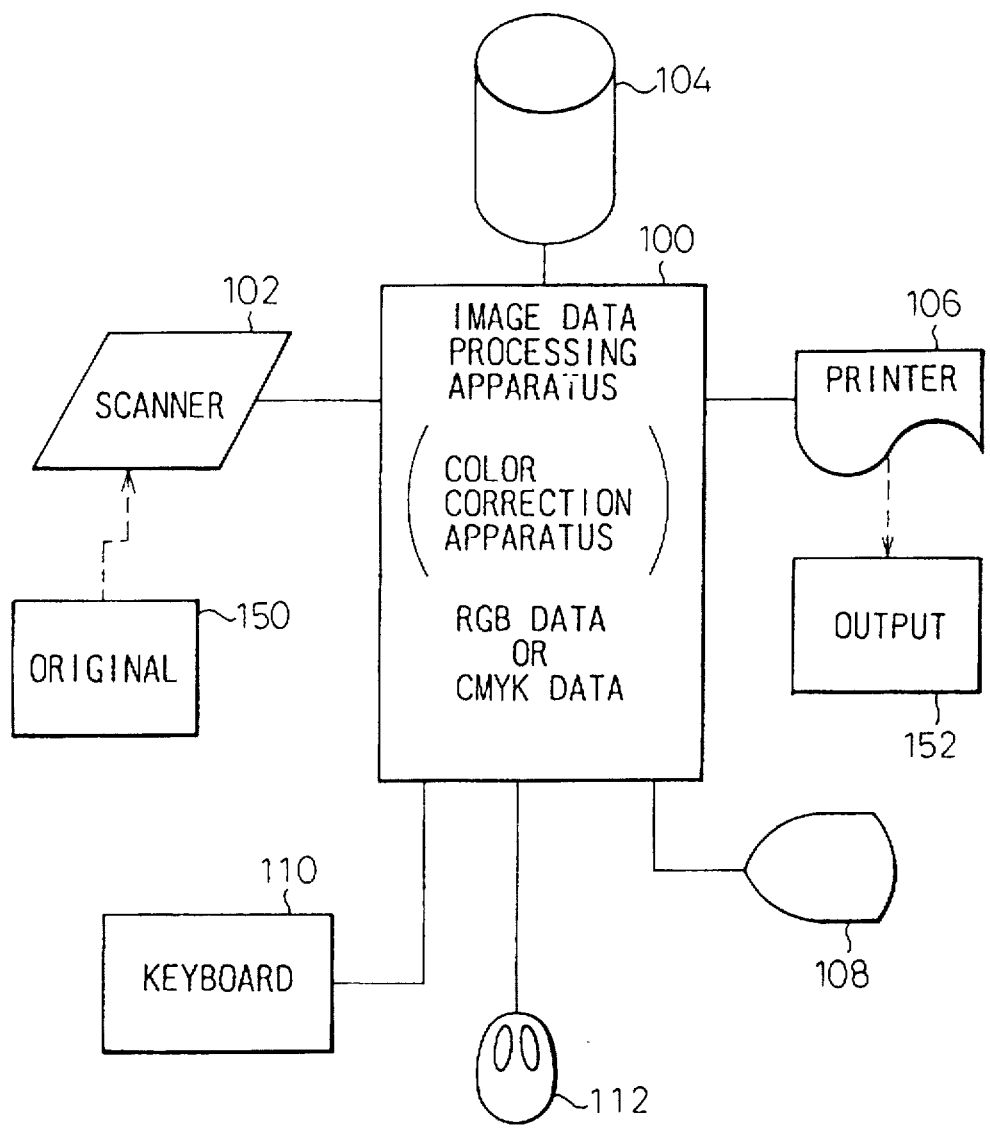
FIG. 1 is a block diagram showing a constitution of a conventional color image processing system.

FIG. 1 is a block diagram showing a constitution of a conventional color image processing apparatus.

In FIG. 1, reference numeral 100 indicates an image data processing apparatus; 102 indicates a color image scanner; 104 indicates a storage unit to store color image data generated by the scanner 102; 106 indicates a color printer which produces printed images according to image data output from the image data processing apparatus 100; 108 indicates a display which produces display images according to image data output from the image data processing apparatus 100; 110 indicates a keyboard; 112 indicates a mouse; 150 indicates an original image read by the color image scanner 102; and 152 indicates a printed image output from the color printer 106.

The color image scanner 102 reads originals such as photographic images, printed images, and so forth and produces digital image data. The digital image data is stored in the storage unit 104. An operator selects image data to be processed and indicates a variety of processes to be performed to the selected image data by using the keyboard 110 and the mouse 112. The image data processing apparatus 100 processes the image data according to the commands given by the operator. The processed image data is stored in the storage unit 104. The image corresponding to the image data is displayed on the display according to the operator's indication. The operator proceeds the image processing operations in viewing the displayed images. The color printer 106 outputs printed images corresponding to the image data according to the operator's commands.

As described above, each conventional color image processing system is respectively a closed system. The conventional color image processing system is constituted with apparatuses which are exclusively developed, and each apparatus of the system is adjusted so that high quality image can be reproduced in the fixed system.

Further, in the conventional color image processing systems, image data is represented in an RGB system of color representation or a CMYK system of color representation. Therefore, when the color fog correction is performed in the conventional color image processing systems, the color of the pixel selected by the operator is displayed on the screen, and the operator respectively changes RGB or CMYK components of the displayed color. Next, an embodiment of the present invention will be described.

Figure 2:
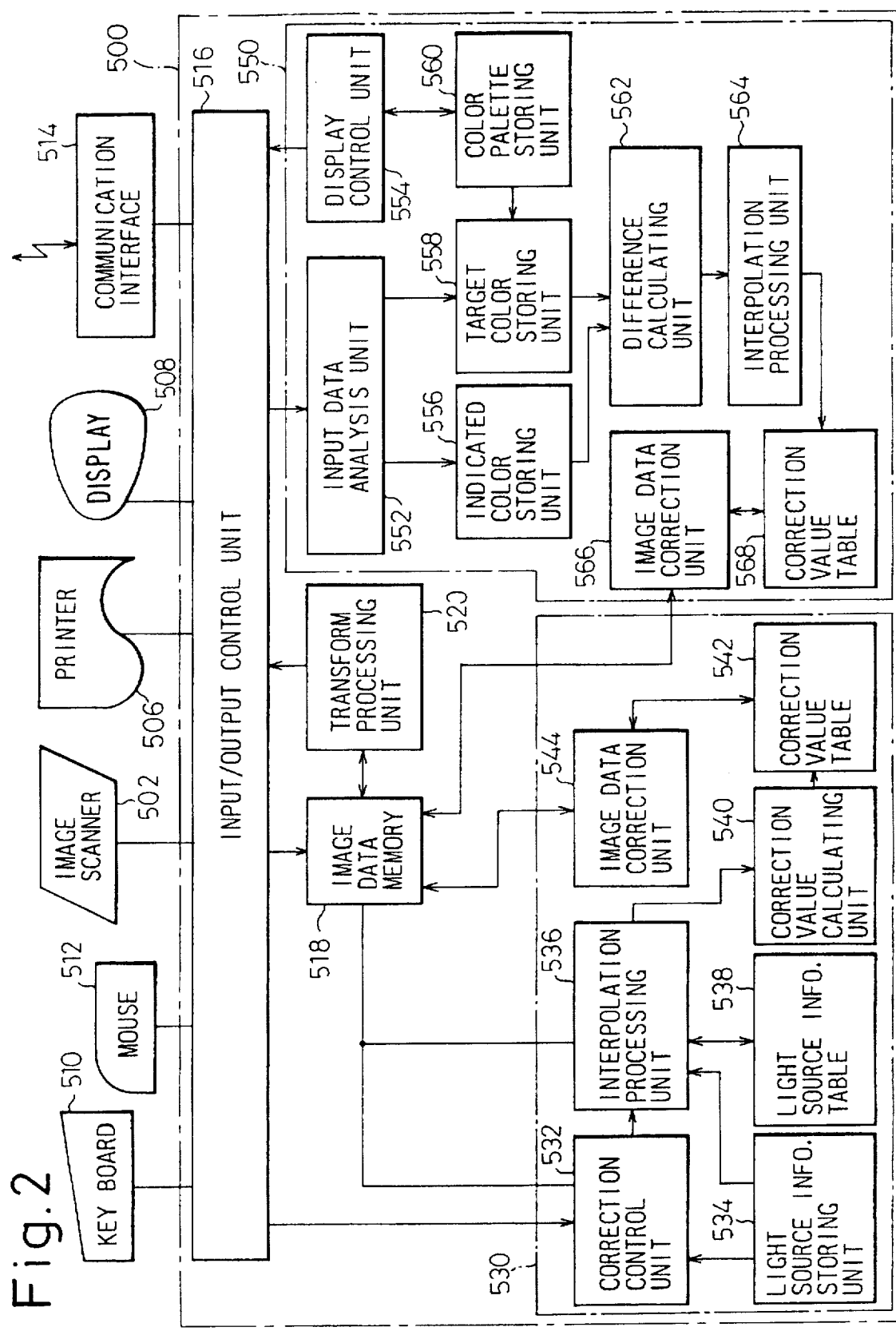
FIG. 2 is a block diagram showing a constitution of a color image processing system of the embodiment of the present invention.

FIG. 2 is a block diagram showing a constitution of a color image processing system of the embodiment.

In FIG. 2, reference numeral 500 indicates an image processing apparatus; 502 indicates a color image scanner; 506 indicates a color printer; 508 indicates a color display; 510 indicates a keyboard; 512 indicates a mouse; 514 indicates a communication interface; 516 indicates an input/output control unit; 518 indicates an image data memory; 520 indicates a transform processing unit; 530 indicates a light source correction processing unit; and 550 indicates a color fog correction processing unit. A data storage unit is also provided, however, it is omitted from FIG. 2. The image processing apparatus is realized by a computer, and the light source correction processing unit 530 and the color fog correction processing unit 550 are realized by software program. The light source correction processing unit 530 includes a correction control unit 532; a light source information storing unit 534; an interpolation processing unit 536; a light source information table 538; a correction value calculating unit 540; a correction value table 542; and an image data correction unit 544. The color fog correction processing unit 550 includes an input data analysis unit 552; a display control unit 554; an indicated color storing unit 556; a target color storing unit 558; a color palette storing unit 560; a difference calculating unit 562; an interpolation processing unit 564; an image data correction unit 566; and a correction value table 568. A color image processing apparatus is composed of all the elements except the color image scanner 502, the color printer 506, the color display 508, the keyboard 510 and the mouse 512.

The color image scanner used in the embodiment is required to output image data represented in the uniform color space (UCS) system, and the color printer 506 and the color display 508 are required to receive image data represented in the UCS system. In this embodiment, an example in which image data is represented in L*a*b* system will be described. However, in the present invention, image data can be represented in any UCS system. The image data read by the color image scanner 502 is stored in the image data memory 518. This color image processing system further provides the communication interface 514 which is used to communicate with other systems, for example, a data base system which stores a many kinds of image data. This system receives image data, which is represented in the L*a*b* system, from the data base system and stores the received image data in the image data memory 518. The image data processed in the color image processing apparatus is also stored in the image data memory 518, and when image data is reproduced as an image, image data is read from the image data memory 518. When the image data is transmitted to other systems, image data is read from the image data memory 518 and is transmitted through the communication interface 514.

Figure 3A:
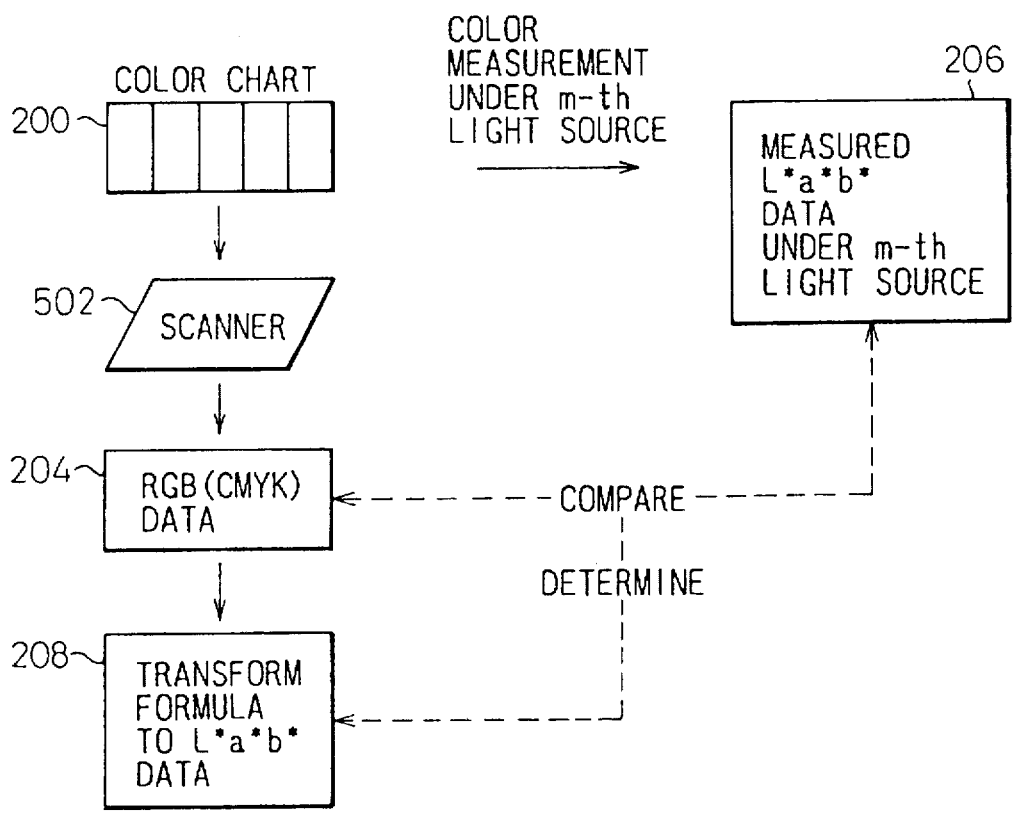
FIG. 3A is a diagram showing a fundamental condition of a color image scanner used in the embodiment.
Figure 3B:
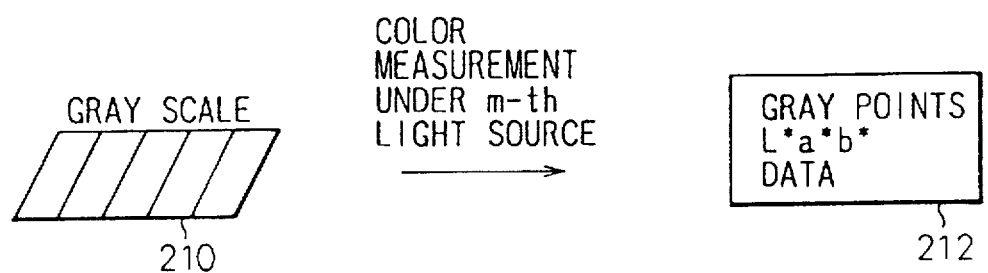
FIG. 3B is a diagram showing a condition in which light source information of image data is obtained.

FIG. 3A is a diagram showing a fundamental condition of a color image scanner used in the embodiment of the present invention, and FIG. 3B is a diagram showing a condition in which light source information for the image data is obtained.

A color image scanner used in the embodiment is required to output image data represented in the L*a*b* system under the illumination of a certain light source and information relating the light source. When a color image scanner has this function, it is directly used with no change. However, when a normal type color image scanner which outputs image data represented in RGB (or CMYK) system of color representation is used, it is changed to output image data represented in the UCS system. These operations will be described with reference to FIG. 3A.

In FIG. 3A, reference numeral 200 indicates a color chart, made by photography, on paper; 502 indicates a color image scanner; 204 indicates RGB (or CMYK) data of the color chart 200 produced by the color image scanner 502; 206 indicates L*a*b* data obtained by measuring the color chart 200 under illumination by a m-th light source by a colorimeter; 208 indicates a transform formula from RGB image data to L*a*b* image data.

The RGB (or CMYK) data 204 corresponds to L*a*b* data 206 because they are obtained from the same color chart 200. The transform formula 208 is determined so that L*a*b* image data obtained by transforming the RGB (or CMYK) data 204 with the transform formula 208 coincides with the L*a*b* data 206. A well-known secondary-order masking equation shown in FIG. 5A is used as the formula 208. Each parameter is determined according to the least squares method. The transform formula 208 is provided in the color image scanner 502. By this, the color image scanner 502 outputs the transformed L*a*b* image data, and the output L*a*b* image data becomes L*a*b* image data under illumination by the m-th light source.

Further, as shown in FIG. 3B, a gray scale chart is previously measured under the same condition in which the L*a*b* data 206 is obtained. Results of the measurement are stored in the color image scanner 502 as gray points L*a*b* data, and when the color image scanner 502 reads an original and outputs color image data, the gray points L*a*b* data 212 is attached to the color image data with an identification indicating the kind of the m-th light source. As described later, in the embodiment, the L*a*b* data of the gray scale is previously measured under illumination by a plurality of light sources, and a plurality of sets of the results of the measurement are stored in the light source information table 538 of the color image data processing apparatus 500 as gray points L*a*b* data. The color image scanner 502 attaches an identification indicating a kind of the light source to the image data. When the color image data processing apparatus 500 receives image data, it reads the identification and obtains the gray points L*a*b* data corresponding to the identification. By this, a capacity of the light source information in image data can be reduced.

Figure 4A:
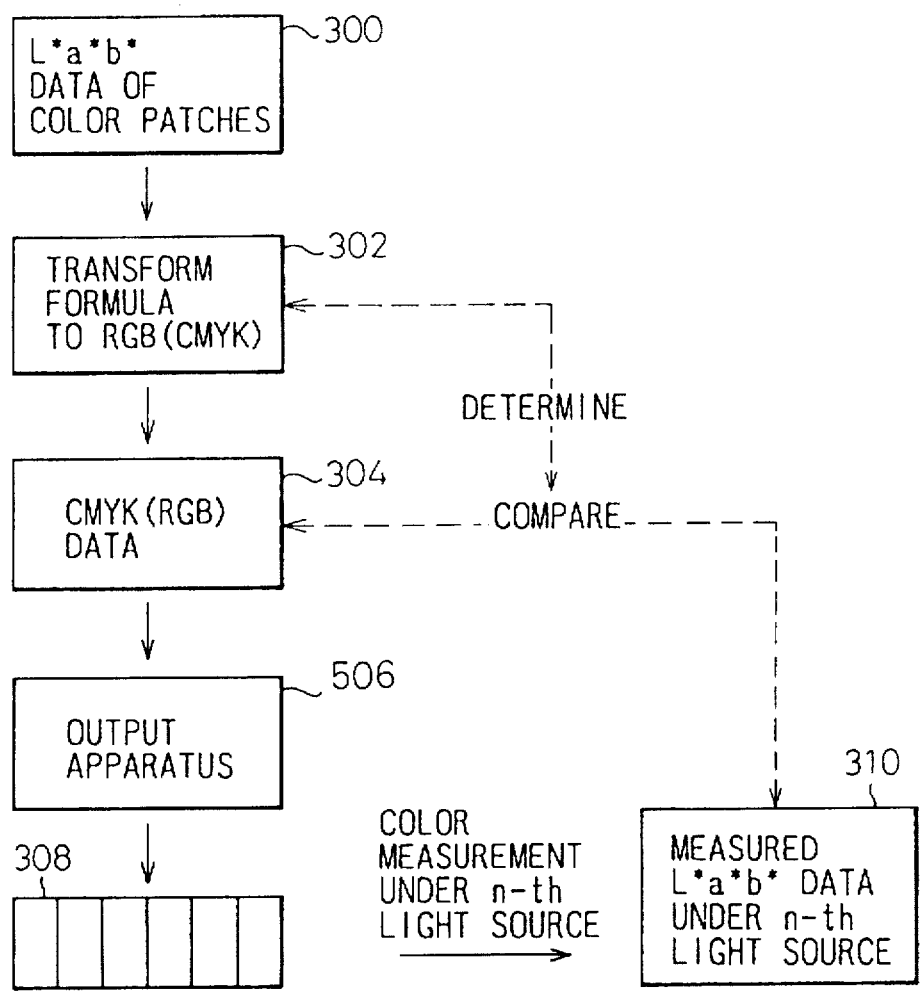
FIG. 4A is a diagram showing a fundamental condition of an output apparatus used in the embodiment.
Figure 4B:
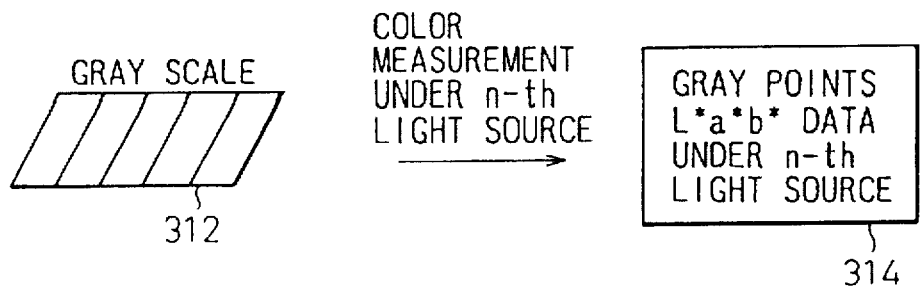
FIG. 4B is a diagram showing a condition in which light source information of the image output apparatus is obtained.

FIG. 4A is a diagram showing a fundamental condition of an image output apparatus used in the embodiment of the present invention. FIG. 4B is a diagram showing a condition in which light source information of the image output apparatus is obtained.

An image output apparatus, such as a color printer, a color display, and so forth, used in the first embodiment is required to receive image data represented in the L*a*b* system under illumination by a certain light source. If a normal type image output apparatus which receives image data represented in the CMYK (or the RGB) system of color representation is used, it is changed to receive image data represented in the L*a*b* system. These operations will be described with reference to FIG. 4A.

In FIG. 4A, reference numeral 300 indicates L*a*b* image data for standard color patches; 302 indicates a transform formula from L*a*b* image data to CMYK (or RGB) image data; 304 is CMYK (or RGB) image data transformed by the transform formula 302; 506 indicates a color printer; 308 indicates color patches produced by the color printer 506; and 310 indicates L*a*b* data obtained by measuring the color patches 308 under illumination of an n-th light source by a colorimeter.

The transform formula 302 is determined so that L*a*b* image data 300 coincides with the L*a*b* image data 310. A well-known secondary-order masking equation shown in FIG. 5B is used as the transform formula 302. Each parameter is determined according to the least squares method. The transform formula 302 is provided in the image output apparatus 506. By this, the color printer 506 receives the L*a*b* image data and outputs images.

Further, as shown in FIG. 4B, a gray scale is previously measured under the same condition in which the L*a*b* data 310 is obtained. As described later, the gray points L*a*b* data 314 is stored in the image output apparatus 506.

When the image output apparatus 506 is connected to the image data processing apparatus 500, the image output apparatus 506 sends the gray points L*a*b* data 212 and an identification indicating the kind of the m-th light source to the image data processing apparatus 500 and they are stored in the light source information storing unit 534. Further, as described later, the image output apparatus 506 may send only the identification. When the color image data processing apparatus 500 corrects image data to fit the output apparatus, it reads the identification and obtains the gray points L*a*b* data corresponding to the identification.

Regarding the color display, the display itself radiates light. Therefore, color of an image displayed on a screen is not directly influenced by a spectral characteristic of illumination. However, color of the image displayed on the screen can be also measured by the colorimeter and L*a*b* data for the displayed color can be defined. Further, the displayed color is practically influenced by the illumination environment. Therefore, in order to precisely produce color images on the screen, the color images must be changed according to characteristics of light sources which are used for illuminating the screen of the display. In the first embodiment, each display is respectively optimized in its own illumination environment, and information relating to a light source which is used for illuminating the screen of the display is recorded.

Figure 6:
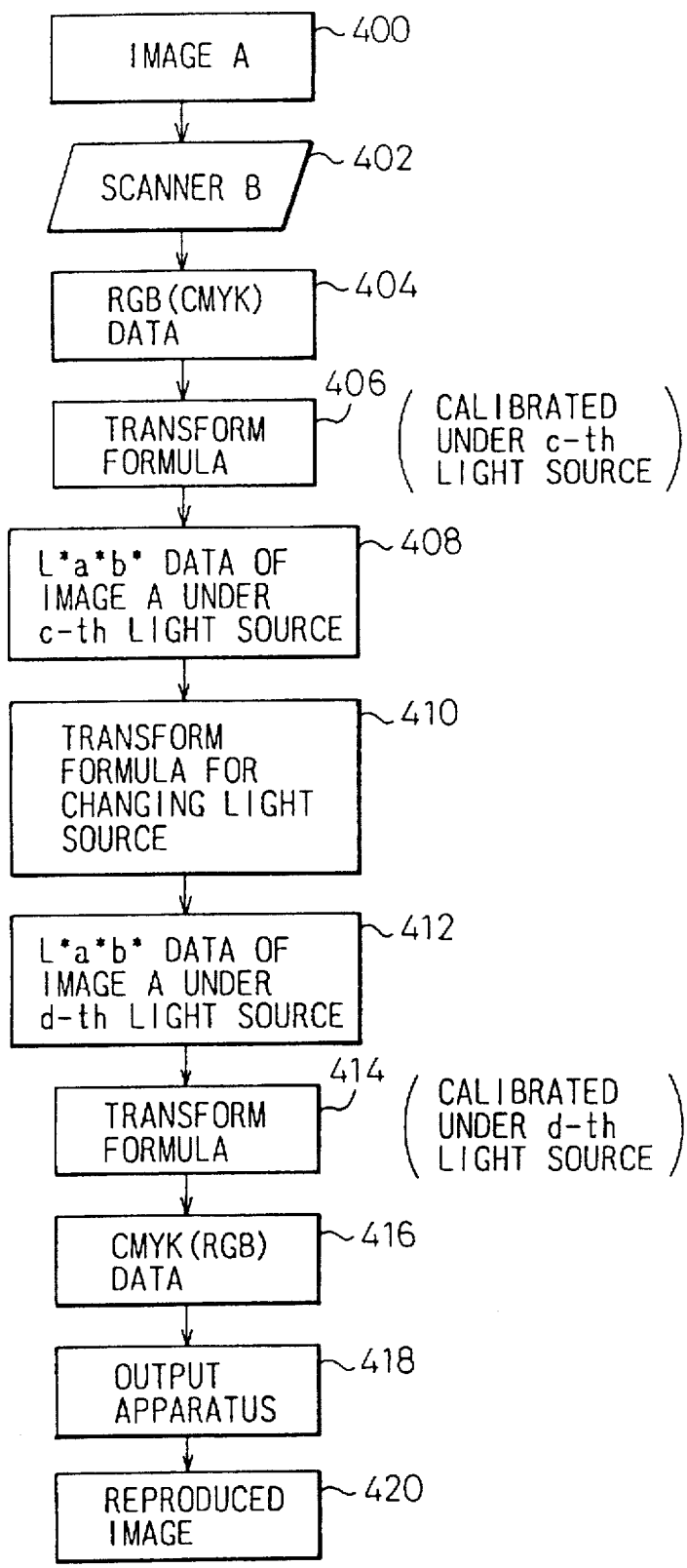
FIG. 6 is a flowchart for explaining the operations in the embodiment.

FIG. 6 is a flowchart showing a total flow of image data in the color correction operation when the image data processing system is constituted with a normal type color image scanner and a normal type color printer in the above-mentioned way.

An original image A is read in the color image scanner B and is converted into RGB data. The RGB data is transformed into L*a*b* data under illumination by a c-th light source by a transform formula. When the image data is output to an output apparatus which receives L*a*b* data under illumination by a d-th light source, the image data is transformed by a transform formula which corrects a difference between the c-th light source and the d-th light source. This operation is performed by the light source correction processing unit 530. In this way, L*a*b* data under illumination by the d-th light source is produced. The transformed L*a*b* data is further transformed into CMYK (RGB) image data, then, an image is produced in an image output apparatus according to the CMYK (RGB) image data. In this way, an image having color almost the same as that of the original image A is produced.

As described above, in the embodiment, the image data is represented in L*a*b* system under illumination by a certain light source and includes information relating to the light source.

FIG. 7 shows a constitution of image data.

As shown in FIG. 7, each image data includes color data of respective pixels consisting of the image, which is represented in the L*a*b* system under illumination of a light source, and an identification indicating the kind of the light source.

For example, in FIG. 3A, when the color chart is measured under illumination of the standard source C, namely, when the m-th light source is the standard source C, the color image scanner is adjusted to output image data represented in the L*a*b* system under illumination of the standard source C. Image data produced by this color image scanner is attached to the identification "C".

As described above, the image output apparatuses such as the color printer 506 and the color display 508 respectively store light source information relating to the illumination of the L*a*b* system in which receiving image data is represented. The light source information stored in each image output apparatus is sent to the light source information storing unit 534 of the light source correction processing unit 530 when the image output apparatus is connected to the image processing apparatus.

FIG. 8 shows the constitution of the light source information storing unit.

As shown in FIG. 8, each light source information includes an identification indicating the kind of the light source relating to the illumination of the L*a*b* system in which image data received by the image output apparatus is represented and the gray points L*a*b* data, which is described in FIG. 4B. The gray points L*a*b* data includes L*a*b* data of at least one point on the gray scale.

FIG. 9 shows a constitution of the light source information table. As shown in FIG. 9, the light source information table stores the gray points L*a*b* data of many kinds of light sources in correspondence with the identifications of each light source. Each pair of identification and gray points L*a*b* data is similar to that shown in FIG. 8.

As described above, image data represented in the L*a*b* system changes according to the spectral characteristics of the illuminating light source. This means that when the light sources are different, the white points of both systems are different even when the same color chart is used. Therefore, when the light source of the representation system for image data is different from that of the output apparatus, a light source correction operation is necessary. In the light source correction operation, a white point in the representation system for the image data is changed to coincide with that of the output apparatus. For example, it is assumed that the light source of the representation system of the image data is the standard source C and that of the display is the standard source D65. When the image data is output to the display, the two light sources are compared and when they are different, the light source correction operation is started.

Figure 10:
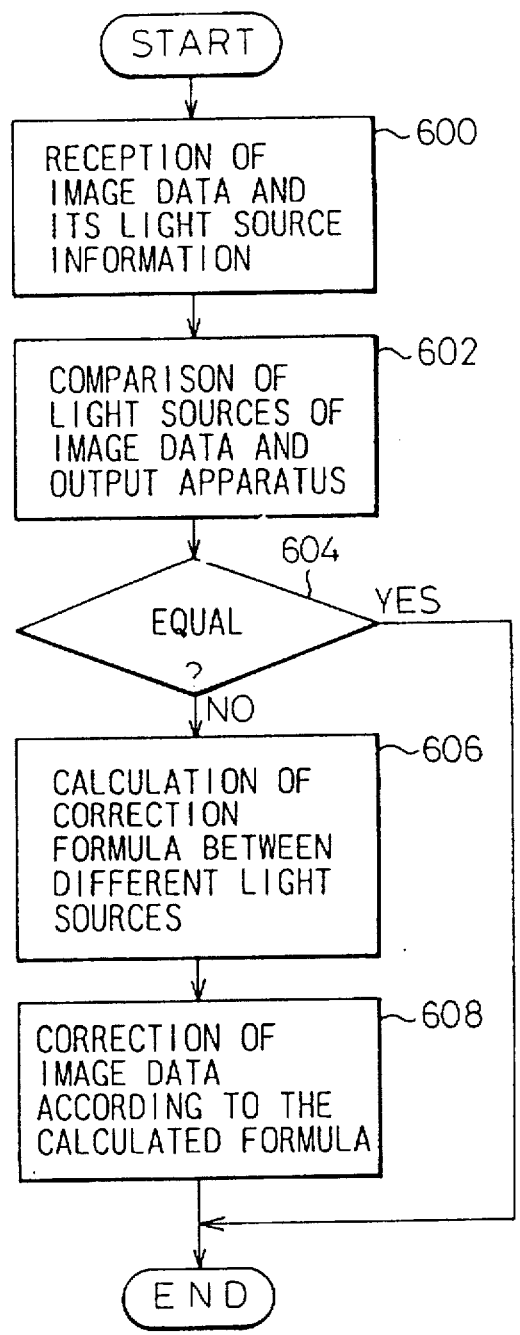
FIG. 10 is a flowchart showing a light source correction operation.

FIG. 10 is a flowchart showing the light source correction operation. The light source correction operation is described with reference to FIG. 10.

An indication of image output is made through the input/output control unit 516.

At step 600, the image data to be output is received and stored in the image data memory 518. If the image data is already stored in the image data memory 518, this operation is unnecessary. The image data includes light source information.

At step 602, the correction control unit 532 extracts the light source information from the image data and compares the light source of the image data with the light source relating to the output apparatus. For example, when the image data is output to the display, the correction control unit 532 compares the identification "C" attached to the image data stored in the image data memory 518 with the identification "D65" stored in the light source information storing unit 534.

At step 603, the correction control unit 532 determines whether the light source correction operation is necessary in response to the judgement result of the step 602. When the light source correction operation is unnecessary, the control proceeds to the conventional operation.

In this case, the light source correction operation is necessary, therefore, the correction control unit 532 commands the interpolation processing unit 536 to start the light source correction operation. At this time, the identifications of the light sources of the image data and the output apparatus are sent with the command.

At step 606, in response to this command, the interpolation processing unit 536 searches for and reads the light source information corresponding to the light source of the representation system of the image data in the light source information table 538. Further, the interpolation processing unit 536 receives the light source information for the output apparatus from the light source information storing unit 534. The interpolation processing unit 536 sends the light source information to the correction value calculating unit 540.

The correction value calculating unit 540 calculates a correction formula according to a difference of characteristics between the two light sources. In the following, this calculation process is described.

The light source correction operation is performed on each surface perpendicular to the lightness index axis in the L*a*b* system space, which surface is determined by the lightness index of each image data. On each surface, two points indicated by pairs of indices a* and b* of chromaticity corresponding to two light sources are determined, and the difference between the two points is calculated. This difference is added to every L*a*b* data on the surface.

Figure 11:
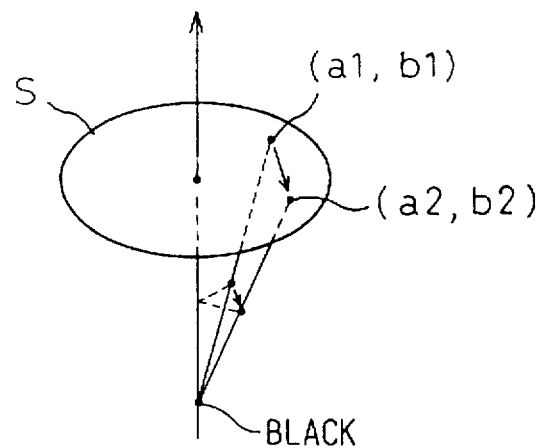
FIG. 11 is a diagram for explaining a correction value calculating process.
Figure 12:
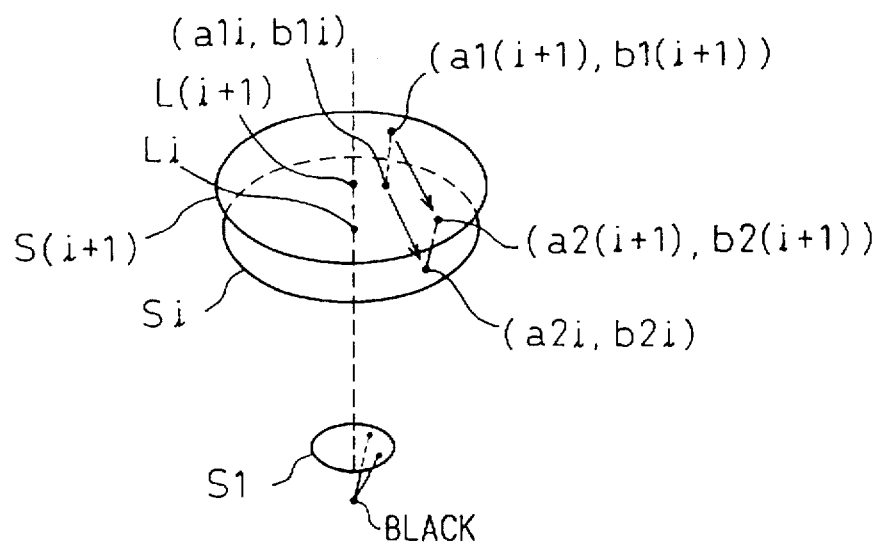
FIG. 12 is a diagram for explaining another correction value calculating process.

FIG. 11 is a diagram for explaining the correction value calculating process of when the gray points L*a*b* data is formed with a set of gray point L*a*b* data of only one gray point. FIG. 12 is a diagram for explaining the correction value calculating process of when the gray points L*a*b* data is formed with sets of gray points L*a*b* data of a plurality of gray points.

In FIGS. 11 and 12, reference S, S1, Sn and S(n+1) indicates surfaces perpendicular to the lightness index axis in the L*a*b* system space, which surface is determined by the lightness index of each set of the gray points L*a*b* data. On each surface, two points indicated by pairs of indices a* and b* of chromaticity of each set of the gray points L*a*b* data are determined. On each surface, the first point corresponding to the first light source is corrected to be a second point corresponding to the second light source. In the range between the point indicating black and the point indicated by the gray point L*a*b* data or in each range between the neighboring surfaces, two points are calculated according to a linear approximation.

As shown in FIG. 11, when the gray points L*a*b* data is formed with a set of gray point L*a*b* data with only one gray point, a point indicating black and the points indicated by the two sets of gray points L*a*b* data are respectively connected with straight lines in the L*a*b* system space. A surface perpendicular to the lightness index axis is determined according to the lightness of the image data. On each surface, two points through which the two straight lines pass are determined. The difference between the two points on every surface is calculated and the difference is stored in the correction value table 542.

FIG. 13 is a diagram for explaining the correction formula calculating method when the gray points L*a*b* data is formed with sets of gray points L*a*b* data of a plurality of gray points. In this case, as shown in FIG. 12, the L*a*b* system space is divided into a plurality of ranges divided by a plurality of surfaces S1, ... Sn, ... indicated by black and the lightness indices of sets of the gray points L*a*b* data. In each range, a linear approximation is also performed, namely, two sets of two points indicated by black or the gray points L*a*b* data are connected with two straight lines. For example, when the set of gray point L*a*b* data of i-th gray points is represented by (Li, ai, bi), a correction formula of indices a* and b* of chromaticity of gray level having a lightness index L included in a range between Li and L(i+1) are determined as shown in FIG. 13. Two sets of the correction formulas corresponding to the two light sources are respectively determined. The differences of the indices a* and b* of chromaticity on every surface perpendicular to the lightness index axis are calculated and the differences are stored in the correction value table 542.

At step 608, the image data correction unit 544 reads the differences stored in the correction value table 542 according to the lightness index of the image data and corrects each image data by adding the differences. The corrected image data is stored in the image data storage unit 518.

The image data obtained in this way is corrected to image data represented in an L*a*b* system under illumination by the standard source D65. Therefore, the transform processing Unit 520 transforms the corrected image data to data represented in RGB system according to the transform formula which is described in FIG. 4A. The RGB image data is output to the display 508 through the input/output control unit 516.

When image data is output to a color printer 506, the image data is corrected to image data represented in L*a*b* system adapted to the color printer in the same way as described above. In this case, the transform processing unit 520 transforms the corrected image data to data represented in CMYK system and outputs the CMYK data to the color printer 506.

When the identification of the light source of the L*a*b* system illumination of the image data coincides with that of the output apparatus, the correction control unit 532 determines that light source correction is unnecessary and commands the transform processing unit 518 to transform image data stored in the image data memory 518 into data adapted to the output apparatus.

In this way, the difference between the white points of image data due to the difference between the light sources is corrected. Image data produced in another systems is transformed into L*a*b* image data adapted to the current system, namely, the dependence of image data on characteristics of the systems is removed, and an original image can be precisely reproduced in any system according to the image data. This means that the color image processing system becomes an open system. Therefore, standardization of image data become possible, and image data can be effectively used by making data base systems for image data.

In the/light source correction operation in the above embodiment, the correction value is determined according to a linear approximation. However, curve approximation may be used. In the following, the light source correction operation using a three-dimensional spline function will be described.

The approximation using the three-dimensional spline function is performed in the place of the linear approximation. Therefore, when the gray points L*a*b* data is formed with sets of gray points L*a*b* data for a plurality of gray points, the L*a*b* system space is divided into a plurality of ranges according to the point indicated by black and the gray points L*a*b* data in the direction of the lightness index. In each range, an approximation using the three-dimensional spline function is performed.

FIG. 12 is a diagram for explaining the approximation method using the three-dimensional spline function.

In the i-th range defined by the i-th L*a*b* data and the (i+1)-th L*a*b* data, a vector composed of indices a* and b* of chromaticity of a gray level having a lightness index L is represented as a function (2) of a variable t which is indicated by the formula (1). Constants A1, A2, A3 and A4 are represented by vectors Pi (ai, bi) which is composed of indices a* ana b* of chromaticness of the i-th L*a*b* data and small coefficients Pi' of the vector Pi. These Pi and Pi' are obtained by solving an equation (4).

By using the approximation of the spline function, the L*a*b* data at every lightness index can be more precisely determined, therefore, a characteristic gray scale corresponding to each light source can be reproduced more precisely. In this way, the correction value calculation unit 540 can calculate more precise correction values ad and bd and outputs of higher quality can be obtained.

In the embodiment, the chromaticity corresponding to every lightness index of the gray scale is calculated in response to an output requirement. However, the chromaticity corresponding to every lightness index of the gray scale may be previously calculated and stored in the light source information storing unit 534 and the light source information table 518. In this case, when image data is output to an image output apparatus, the stored chromaticity a, b are read according to the lightness index, and the correction value calculation unit 540 respectively calculates the differences of a and b between different light sources. In this way, the correction values ad and bd are obtained. Therefore, the interpolation processing unit 536 can be omitted because the calculation of the chromaticity corresponding to every lightness index of the gray scale is unnecessary. In this way, the light source correction operation is made faster even though the amount of the light source information increases.

Further, the chromaticity corresponding to every lightness index of the gray scale can be determined according to a detailed characteristic of an image output apparatus and the light source, and the light source information storing unit 534 stores the light source information including this chromaticity. In this way, the reproduction quality is further improved.

Further, in the embodiment, light source information for the image data includes only an identification of a light source. However, the light source information can include gray points L*a*b* data for the gray scale this case, the light source information has a constitution shown in FIG. 8, and the light source information table 538 can be omitted.

The light source information of image data may further include the detailed characteristics of a color image scanner which is used to generate the image data. In this case, gray points L*a*b* data of the gray scale can be generated by using the detailed characteristics of the color image scanner.

Further, in the embodiment, the image output apparatus sends the light source information including gray points L*a*b* data of the gray scale. However, the image output apparatus may send only the identification. When the color image data processing apparatus 500 corrects image data to be suitable for the output apparatus, it reads the identification and obtains the gray points L*a*b* data corresponding to the identification. In this case, the light source information sent by the image output apparatus has the constitution shown in FIG. 9.

Next, the color fog correction processing unit 550 shown in FIG. 2 will be described.

Figure 15:
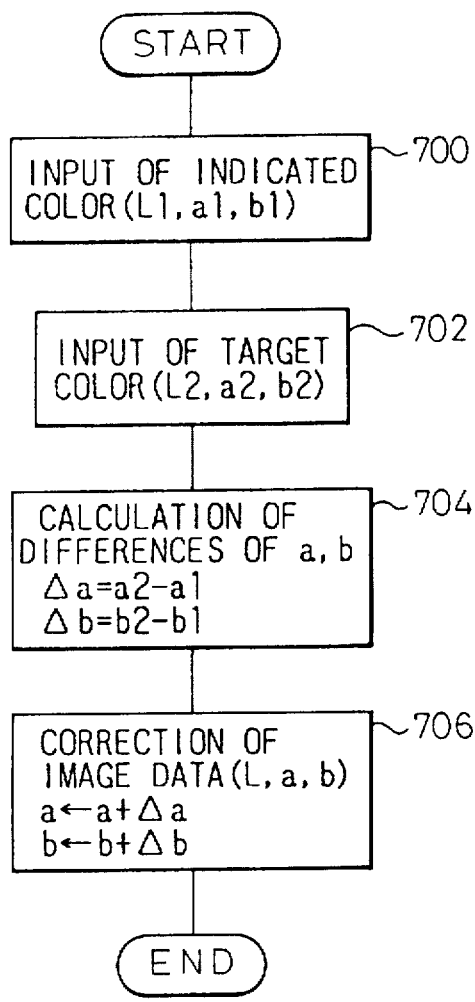
FIG. 15 is a flowchart showing operations of color fog correction.
Figure 16:
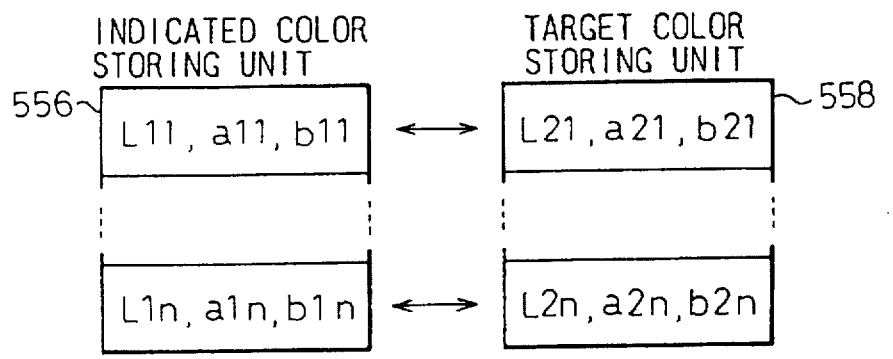
FIG. 16 is a diagram showing constitutions of a indicated color storing unit and a target color storing unit.
Figure 17:
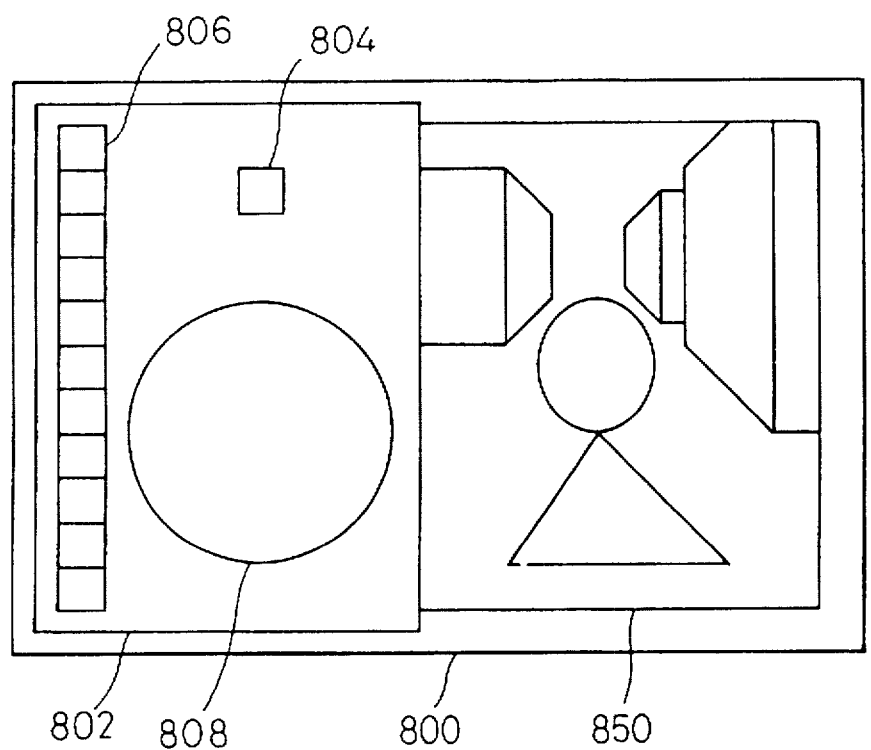
FIG. 17 is a diagram showing an example of a displayed scene in a color fog correction operation.

FIG. 15 is a flowchart showing the color fog correction operation. FIG. 16 is a diagram showing the constitutions of the indicated color storing unit 556 and the target color storing unit 558. FIG. 17 is a diagram showing an example of a displayed scene in a color fog correction operation.

At step 700, an operator selects a color, which is base color of the operation, by indicating a pixel in the displayed image. The operator indicates a pixel in the image displayed on the screen by using the mouse 512 or so forth. The color of the pixel is input as the indicated color.

The input data analysis unit 552 analyzes an operator input through the input/output control unit 516. In response to the analyzed results, the input data analysis unit 552 sends indications to the display control unit 554, sends information regarding the indicated color to the indicated color storing unit 556. In practice, the input data analysis unit 552 informs the indicated color storing unit 556 of the coordinates of at least one pixel selected through the input/output control unit 516 by using the mouse 512. In response to this information, the indicated color storing unit 556 reads and holds L*a*b* data of the corresponding pixel from the image data memory 518. As shown in FIG. 16, the indicated color storing unit 556 can store a plurality of sets of L*a*b* data. When only one pixel is indicated, only one set of the L*a*b* data is stored. In this way, the color to be processed is indicated and input.

At step 702, in response to the indication from the input data analysis unit 552, the display control unit 554 produces display information for displaying a color pallet by using information stored in the color pallet storing unit 560, and outputs it to the display 508 through the input/output control unit 516. The color pallet storing unit 560 stores L*a*b* data indicating each color in the color pallet. The display control unit 554 transforms the L*a*b* data into RGB data adapted to the display 508 and generates display data representing the color pallet. For example, a screen as shown in FIG. 17 is displayed. In FIG. 17, reference numeral 800 indicates a screen of the display, 802 indicates a new window which is opened for displaying the color pallet, 804 indicates the indicated color, 806 indicates a color pallet which has the same chromaticity as that of the indicated color and changes the lightness, 808 indicates a color palette which changes its chromaticity on the surface having the same lightness index at that of the indicated color, and 850 indicates a window in which the image to be processed is displayed.

The operator further selects a target color by indicating a color on a color pallet displayed on the screen with the mouse 512. The input data analysis unit 552 informs the target color storing unit 558 of the indicated position on the color pallet. In response to this information, the target color storing unit 558 reads and holds the corresponding L*a*b* data from the color pallet storing unit 560. In this way, the target color is selected and input. Therefore, the target color storing unit 558 holds the L*a*b* data shown in FIG. 16.

Namely, the indicated color input means is realized by a combination of the mouse 512, the input/output control unit 516 and input data analysis unit 552, and the target color input means is realized by a combination of the mouse 512, the input/output control unit 516, input data analysis unit 552, the display control unit 554 and the color pallet storing unit 560.

At step 704, the difference calculating unit 562 calculates the difference between the indicated color and the target color, and the interpolation processing unit 564 calculates correction functions by which chromaticity correction values ac and bc are obtained according to chromaticity a and b and lightness index L. For example, when only one indicated color is input, the difference calculating unit 562 calculates the differences $\Delta a$ and $\Delta b$ of the chromaticity by respectively subtracting indices a0 and b0 of chromaticity of the L*a*b* data of the target color from indices as and bs of chromaticity of the L*a*b* data of the indicated color. In response to this, the interpolation processing unit 564 calculates two straight lines in the L*a*b* system space by respectively connecting a point indicating black and the two points indicated by the indicated color and the target color. Similar to the light source correction operation, a surface perpendicular to the lightness index axis is determined according to the lightness of the image data. On each surface, two points through which the two straight lines pass are determined. The difference between the two points on every surface is calculated as the correction values ac and bc. Therefore, these correction values ac and bc are represented as first-order functions of the lightness index L in the L*a*b* system space. The correction values ac and bc are stored in the correction value table 568.

When some kinds of indicated color are input, the L*a*b* system space is divided into ranges by dividing it with surfaces which respectively include the lightness index axis and positions indicated by the indicated color. In each range, the above-mentioned processes are respectively performed.

The image data correction unit 566 corrects the image data by adding the correction values ac and bc to a and b of the L*a*b* image data. The correction values ac and bc obtained in the above processes respectively indicate unnecessary components included in the image data, therefore, the fog of image is corrected.

As described above, by using the color fog correction processing unit 550, an operator directly indicates the target color on the pallet, therefore, the operator can proceed the operation with viewing the effect of the correction. Further, because the unnecessary color components are estimated by calculating the difference between the indicated color and the target color in the L*a*b* system space, the correction result similar to the operator's perception can be obtained. The L*a*b* system space is a uniform color space, therefore the correction values ac and bc obtained in the L*a*b* system space by the above processes are similar to the unnecessary color components perceived by the operator.

In this way, because the color fog correction operation can be made to agree with human perception, the difficulty of the color fog correction operation is largely reduced. Further, a color image processing system in which an operator having insufficient experience can easily perform the color fog correction operation is realized.

There can be some modifications. For example, when only one set of the indicated color and the object color are input, the difference between the indicated color and the object color can be used as the correction values ac and bc for every lightness index. In this case, the correction values obtained by the difference calculating unit 562 are directly sent to the image data correction unit 566, and the image data correction unit 566 corrects indices a* and b* of L*a*b* data of each pixel by respectively adding the correction values ac and bc to them. Therefore, the correction value table 568 can be omitted and the color fog correction operation can be performed in a short time.

Further, the dependency of image data on the system can be deleted by performing the light source correction with the color fog correction processing unit 550.

For example, a portion of an image which reflects a color of a light source is searched, and a plurality of indicated colors are input by indicating a plurality of pixels in the portion each of which indicates difference lightness levels. Then, a plurality of target colors corresponding to the plurality of indicated colors are input by using the color pallet. When the image has a portion which is certainly white in the original, the indicated colors are input by indicating this portion, and achromatic colors having same lightnesses as those of the indicated colors are indicated as the target colors. In this way, the indicated color storing unit 556 and the target color storing unit 558 respectively store the indicated colors and the target colors. In response to this, the difference calculating unit 562 and the interpolation processing unit 564 calculate correction values ac and bc of chromaticness as a function of lightness L in the same way as the color fog correction operation.

The correction values ac and bc obtained in this way reflect the difference between light sources of the image data and the display apparatus 508 and correspond to the correction values ad and bd obtained in the white point correction process, namely, the light source correction. Therefore, by correcting L*a*b* data in the image data memory 518 with the correction values ac and bc, an effect the same as that of the white point correction process can be obtained. In this method, the image data does not need to include an identification of a light source. Therefore, image data which is not standardized to include information relating to a light source of an image data representation system are also corrected by applying this method and a high quality image can be produced from the image data. In this way, this method can be applied to image data obtained in various systems. When image data represented in the RGB system or the CMYK system is input, it is transformed into L*a*b* data by using an appropriate light source such as a light source of the display 508, then, the above-mentioned method is applied to the transformed data.

We claim:

1. A color correction apparatus for correcting color image data represented in a uniform color space system under illumination of a first light source into color image data represented in the uniform color space system under illumination of a second light source, comprising:

correction formula calculating means for calculating a correction formula corresponding to a difference of characteristics between said first light source and said second light source; and light source difference correction means for correcting said color image data according to said correction formula.

2. A color correction apparatus as set forth in claim 1, further comprising:

a light source information storing means for storing second light source information relating to said second light source, wherein said color image data includes first light source information relating to said first light source.

3. A color correction apparatus as set forth in claim 2, wherein said first light source information includes an identification showing a kind of said first light source and characteristic information showing a characteristic of said first light source; and said second light source information includes an identification showing a kind of said second light source and characteristic information showing a characteristic of said second light source.

4. A color correction apparatus as set forth in claim 3, wherein said first and second light source information respectively includes a lightness index and chromaticity indices of at least one point of a gray scale under illumination of respective light source; and said correction formula calculating means calculates differences of chromaticity indices due to the difference of characteristics of said light sources as a function of lightness index according to a difference of positions of said gray scale of the two different light sources.

5. A color correction apparatus as set forth in claim 4, wherein said correction formula calculating means includes:

interpolation processing means for generating imaginary gray scales over all the ranges corresponding to said first and second light sources by performing interpolation processes according to said first and second light source information; and correction value calculating means for calculating differences of chromaticity indices of said imaginary gray scales on each discrete surface perpendicular to the lightness index axis; and said light source difference correction means corrects image data by said differences of chromaticness indices corresponding to a lightness index.

6. A color correction apparatus as set forth in claim 2, wherein said first light source information includes an identification showing a kind of said first light source; and said second light source information includes an identification showing a kind of said second light source;

said correction formula calculating means includes a characteristic information table for storing characteristics of light sources in a form corresponding to identifications showing kinds of light sources and calculates said correction formula according to said characteristics of said first light source and second light source read from said characteristic information table.

7. A color correction apparatus as set forth in claim 6, wherein said characteristics of light sources stored in said characteristic information table includes a lightness index and chromaticity indices of at least one point of a gray scale under illumination of respective light sources; and said correction formula calculating means calculates differences of chromaticity indices due to the difference of characteristics of said light sources as a function of a lightness index according to a difference of positions of said gray scale of the two different light sources.

8. A color correction apparatus as set forth in claim 7, wherein said correction formula calculating means includes:

interpolation processing means for generating imaginary gray scales over all the ranges corresponding to said first and second light sources by performing interpolation processes according to said first and second light source information; and correction value calculating means for calculating differences of chromaticity indices of said imaginary gray scales on each discrete surface perpendicular to the lightness index axis; and said light source difference correction means corrects image data by said differences of chromaticness indices corresponding to a lightness index.

9. A color correction apparatus as set forth in claim 2, wherein said first light source information includes an identification showing a kind of said first light source; and said second light source information includes an identification showing a kind of said second light source and characteristic information showing a characteristic of said second light source;

said correction formula calculating means includes a characteristic information table for storing the characteristics of light sources in a form corresponding to identifications showing kinds of light sources and calculates said correction formula according to said characteristic of said first light source read from said characteristic information table and said characteristic of said second light source.

10. A color correction apparatus as set forth in claim 9, wherein said second light source information includes a lightness index and chromaticness indices of at least one point of a gray scale under illumination of said second light source;

said characteristics of light sources stored in said characteristic information table includes a lightness index and chromaticity indices of at least one point of a gray scale under illumination of respective light sources; and said correction formula calculating means calculates differences between chromaticity indices due to the difference of characteristics of said light sources as a function of lightness index according to a difference of positions of said gray scale of the two different light sources.

11. A color correction apparatus as set forth in claim 10, wherein said correction formula calculating means includes:
  interpolation processing means for generating imaginary gray scales over all the ranges corresponding to said first and second light sources by performing interpolation processes according to said first and second light source information; and
  correction value calculating means for calculating differences of chromaticity indices of said imaginary gray scales on each discrete surface perpendicular to the lightness index axis; and said light source difference correction means corrects image data by said differences of chromaticness indices corresponding to a lightness index.

12. A color correction apparatus as set forth in claim 2, further comprising:

a correction control means for judging whether or not said first light source coincides with said second light source and starting a light source correction operation when said first light source is not the same as said second light source, wherein said correction formula calculating means and said light source difference correction means are activated only when said light source correction operation is started.

13. A color correction apparatus as set forth in claim 1, further comprising:

a correction control means for judging whether or not said first light source coincides with said second light source and starting a light source correction operation when said first light source is not the same as said second light source, wherein said correction formula calculating means and said light source difference correction means are activated only when said light source correction operation is started.

14. A color correction apparatus for correcting color image data, comprising:

an indicated color input means for receiving image data, which represents the color of at least one pixel of a displayed image in a uniform color space system, as an indicated color according to an indication of said at least one pixel on said displayed image;

a target color input means for receiving a target color indicated as a color to which said at least one pixel is corrected;

a difference calculating means for calculating unnecessary color components included in each pixel of the displayed image according to a color difference between the indicated color of said at least one pixel and target color corresponding to said indicated colors; and an image data correction means for correcting said image data in said uniform color space system according to said unnecessary color components.

15. A color correction apparatus as set forth in claim 14, wherein said difference calculating means calculates chromaticity indices indicating said unnecessary color components as a function of a lightness index according to a color difference between said at least one indicated color and a target color corresponding to said indicated color.

16. A color correction method for correcting color image data represented in a uniform color space system under illumination by a first light source into color image data represented in the uniform color space system under illumination of a second light source, comprising:

a step for judging whether or not said first light source coincides with said second light source;

a step for calculating a correction formula corresponding to said a difference of characteristics between said first light source and said second light source when said first light source is not same to said second light source; and a step for correcting said color image data according to said correction formula.

17. A color correction method as set forth in claim 16, wherein said image data includes first light source information relating to said first light source;

said first light source information and second light source information relating to said second light source respectively include lightness indices and chromaticity indices of at least one point of a gray scale under illumination by respective light source; and at said step for calculating said correction formula, differences between chromaticity indices due to the differences between the characteristics of said light sources are calculated as a function of a lightness index according to a difference between the positions of said gray scales of the two different light sources.

18. A color correction method for correcting color image data, comprising:

a step for receiving image data, which represents the color of at least one pixel of a displayed image in a uniform color space system, as an indicated color according to an indication of said at least one pixel on said displayed image;

a step for receiving target color indicated as a color to which said at least one pixel is corrected;

a step for calculating unnecessary color components included in each pixel of the displayed image according to a color difference between an indicated color of said at least one pixel and a target color corresponding to said indicated colors; and a step for correcting said image data in said uniform color space system according to said unnecessary color components.

19. A color image processing system comprising:

an image processing unit for processing dolor image data represented in a uniform color space system under illumination by a first light source, said color image data including first light source information relating to said first light source; and image output means for receiving color image data represented in a uniform color space system under illumination by a second light source from said image processing unit and producing color images according to said color image data received from said image processing unit;

said image processing unit comprising:

a light source information storing means for storing second light source information relating to said second light source, a correction control means for extracting said first light source information from said color image data and judging whether or not said first light source coincides with said second light source and starting a light source correction operation when said first light source is not the same as said second light source, a correction formula calculating means for calculating a correction formula corresponding to a difference in characteristics between said first light source and said second light source; and a light source difference correction means for correcting said color image data according to said correction formula.

20. A color correction apparatus for correcting a color image, comprising:

an indicated color unit to receive an indicated color representing a pixel of the color image represented in a uniform color space;

a target color unit to receive a target color corresponding to human perception of the indicated color represented in the uniform color space;

a difference calculating unit to calculate a difference between the indicated color and the target color;

an interpolation processing unit to calculate color correction values based on the difference between the indicated color and the target color; and a color image correction unit to correct the color image in the uniform color space according to the color correction values.

* * * * *

UNITED STATES PATENT AND TRADEMARK OFFICE
CERTIFICATE OF CORRECTION

PATENT NO. : 5,717,783
DATED : Feb. 10, 1998
INVENTOR(S) : Hiroyuki ENDO et al.

It is certified that error appears in the above-identified patent and that said Letters Patent is hereby corrected as shown below:

Col. 3, line 40, change "a," to --a--.

Col. 5, line 54, begin a new paragraph with "Next,".

Col. 11, line 48, change "the/light" to --the light--.

Col. 12, line 5, change "ana" to --and--;
line 42, after "gray scale" insert --. In--.

Col. 19, line 5 (Claim 19, line 2), change "dolor" to --color--.

Signed and Sealed this

Nineteenth Day of May, 1998

Attest:

BRUCE LEHMAN

Attesting Officer

Commissioner of Patents and Trademarks